[63.]
E. DUMMER'S INVENTION
for
REDUCING FRICTION
No. 118,703.           Patented Sep. 5, 1871.
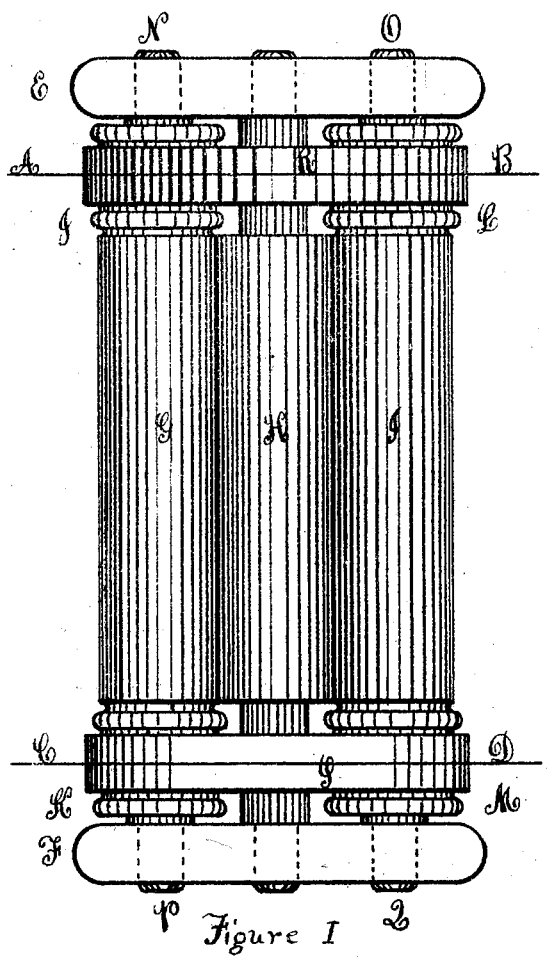
Figure I
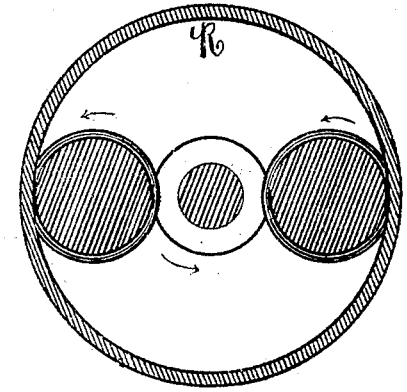
Section on A B
Figure 2
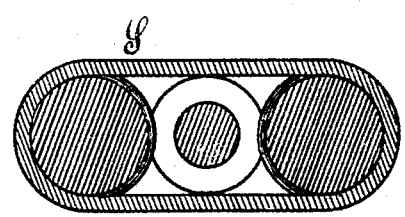
Section on C D
Figure 3
Inventor,
Edward Dummer
Witnesses:
Frederick W. Blake
Leonard N. Kent.

UNITED STATES PATENT OFFICE.

EDWARD DUMMER, OF NEWBURY, MASSACHUSETTS.

IMPROVEMENT IN DEVICES FOR REDUCING FRICTION ON ROLLERS AND BEARINGS.

Specification forming part of Letters Patent No. 118,703, dated September 5, 1871.

*To all whom it may concern:*

Be it known that I, EDWARD DUMMER, of Newbury, in the county of Essex and State of Massachusetts, have invented a Device for Reducing Friction on Bearings, of which the following is a specification:

My invention relates to the use of rings for clasping about rolls or shafts, which rolls or shafts have to sustain a pressure tending to displace or thrust them apart one from another, for the purpose of reducing rubbing or sliding friction on the bearings of said rolls or shafts by substituting rolling friction.

Figure 1 is a representation of one form of application embodying my invention. Fig. 2 is a section on the line A B, showing the use of ring.

E F are parts of frame supporting the rolls G H I. Said frame may be of any form or part of any machine adapted to the work to be performed. G H I are three rolls, which may be made of such material and of such form as are adapted to the work they are to perform. If two rolls only were necessary for said work, for the other roll might be substituted one or more shorter or parts of rolls on the same shaft. If any more rolls were necessary for said work, then any number of rolls might be used with the introduction of an additional roll, (or rolls on the same shaft,) if necessary to change direction of motion in specification. Instead of these rolls there may be simply shafts, which have to sustain a pressure tending to thrust them from each other, in which case my invention would also apply. J K are rollers, collars, or bearings, either one piece with the roll G or separate pieces on the same shaft, or simply the shaft itself, in either case resting upon the inner side of rings, as R. L h are rollers or collars bearing upon the said rings, either one piece with the roll I or separate pieces on the same shaft, or simply parts of the shaft itself. N O P Q are the bearings for the rolls G I, which, were it not for said rings, should the rolls have to sustain a pressure tending to thrust them from each other, would resist said pressure only by pressing upon their supports, and when in motion causes a rubbing or sliding friction, but with use of the rings would be relieved, for the most part, of such rubbing friction. The supports for the bearings or shafts N O P Q are to keep said shafts in position, and may be slotted should the work require the rolls to separate from each other. R is a ring, which may be made elastic or inelastic, of any suitable form, of any suitable material, of one, two, or more pieces, as the work to be performed may require. One, two, or more rings may be used on the same combination of rolls or shafts.

I claim as my invention—

The rings, constructed, arranged, and combined with the rolls, collars, or rollers, bearings, and shafts, substantially as and for the purpose hereinbefore set forth.

EDWARD DUMMER.

Witnesses:
FREDERICK W. BLAKE,
LEONARD N. KENT.